United States Patent
Lin et al.

(10) Patent No.: US 10,753,806 B2
(45) Date of Patent: Aug. 25, 2020

(54) NON-CONTACT TEMPERATURE MEASURING DEVICE

(71) Applicant: RADIANT INNOVATION INC., Hsinchu (TW)

(72) Inventors: Tseng-Lung Lin, Hsinchu (TW); An-Chin Lai, Taichung (TW)

(73) Assignee: RADIANT INNOVATION INC., Hsinchu (TW)

( * ) Notice: Subject to any disclaimer, the term of this patent is extended or adjusted under 35 U.S.C. 154(b) by 519 days.

(21) Appl. No.: 15/647,743

(22) Filed: Jul. 12, 2017

(65) Prior Publication Data
US 2019/0017877 A1    Jan. 17, 2019

(51) Int. Cl.
| | |
|---|---|
| G01K 1/16 | (2006.01) |
| G01J 5/08 | (2006.01) |
| G01J 5/10 | (2006.01) |
| G01J 5/02 | (2006.01) |

(52) U.S. Cl.
CPC ........... *G01J 5/0809* (2013.01); *G01J 5/0265* (2013.01); *G01J 5/0806* (2013.01); *G01J 5/089* (2013.01); *G01J 5/0896* (2013.01); *G01J 5/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,172,978 A | * | 12/1992 | Nomura | G01J 5/08 250/353 |
| 5,412,676 A | * | 5/1995 | Schnier | H01S 3/1303 372/18 |
| 2005/0117624 A1 | * | 6/2005 | Hollander | G01J 5/0044 374/120 |
| 2015/0219500 A1 | * | 8/2015 | Maes | H04N 9/3194 353/33 |

* cited by examiner

*Primary Examiner* — Lisa M Caputo
*Assistant Examiner* — Nasir U. Ahmed
(74) *Attorney, Agent, or Firm* — Li & Cai Intellectual Property (USA) Office

(57) ABSTRACT

The instant disclosure provides a non-contact temperature measuring device including a base, a temperature measuring module, a light module and a reflecting module. The temperature measuring module is disposed on the base. The temperature measuring module has a measuring area. The light module is disposed on the base and is configured to generate a projecting light. The reflecting module is disposed on the base and has a reflecting surface. The projecting light is projected onto the reflecting surface and is reflected by the reflecting surface, thereby forming at least two reflecting light beams adjacent to the measuring area. The at least two reflecting light beams surround a marking area which is able to overlap with the measuring area, and the range of the marking area changes according to the distance between the object to be measured and the non-contact temperature measuring device.

5 Claims, 16 Drawing Sheets

NON-CONTACT TEMPERATURE MEASURING DEVICE

BACKGROUND

1. Technical Field

The instant disclosure relates to a temperature measuring device, and in particular, to a non-contact temperature measuring device.

2. Description of Related Art

Temperature measuring devices are categorized into contact and non-contact temperature measuring devices, in which non-contact temperature measuring devices are widely used in daily life, among which the Industrial radiance temperature measuring devices are most common. However, since such a temperature measuring device lacks an aiming device, the measuring range thereof can be uncertain and inaccurate.

The existing non-contact temperature measuring devices such as infrared thermometers have a measuring range proportional to the measuring distance. A commonly used infrared thermometer has a predetermined angle of view and field of view (FOV) which is usually presented as D:S (distance: spot size). Since the measuring range of the non-contact temperature measuring devices cannot be observed by the naked eye, such devices often include an eye-viewing system or an aiming device for indicating the range of the measurement.

In addition, in the existing art, a laser unit is used to aim at the object to be measured and such a laser unit is usually disposed above or on a side of the radiation temperature measuring device. Therefore, the optical axis of the laser unit is parallel to the central axis of the radiation temperature measuring device. However, the central axis of the radiation temperature measuring device and the laser spot still have a predetermined distance therebetween, so that the user may not be able to determine an accurate measuring range and an inaccurate temperature value may be obtained.

SUMMARY

The object of the instant disclosure is to provide a non-contact temperature measuring device for overcoming the problems in the existing art.

An exemplary embodiment of the instant disclosure provides a non-contact temperature measuring device including a base, a temperature measuring module, a light module and a reflecting module. The temperature measuring module is disposed on the base and has a measuring area. The light module is disposed on the base and is configured to generate a projecting light. The reflecting module is disposed on the base and has a reflecting surface. The projecting light is projected onto the reflecting surface and is reflected by the reflecting surface for forming at least two reflecting light beams adjacent to the measuring area.

The advantages of the instant disclosure are that the at least two reflecting light beams formed adjacent to the measuring range can be formed by the reflecting module, and hence, a marking area surrounded by the at least two reflecting light beams overlaps with the measuring area, and the size of the marking area can be changed according to the distance between the object to be measured and the non-contact temperature measuring device.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
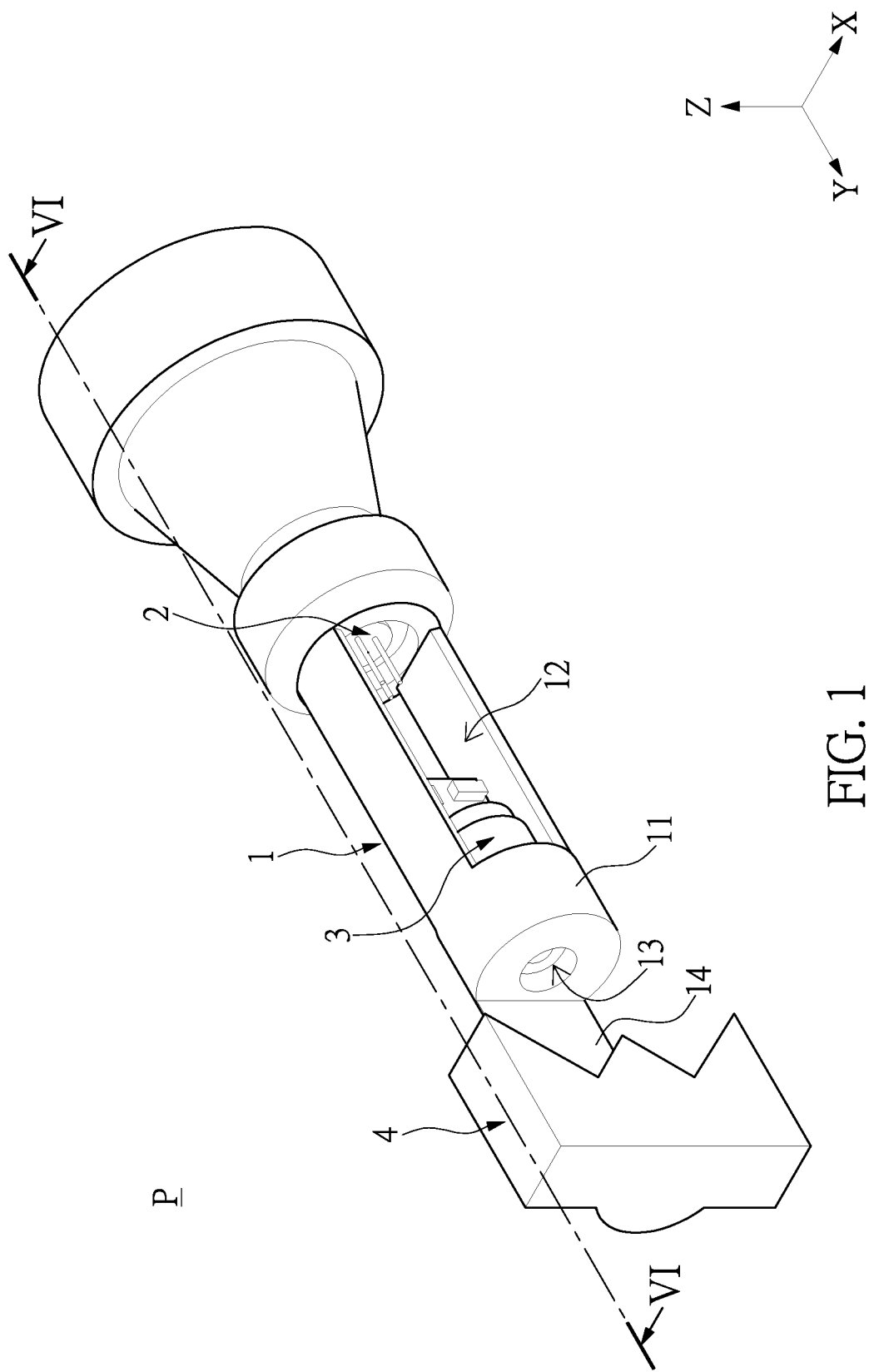
FIG. 1 is a three-dimensional assembled schematic view of the non-contact temperature measuring device of a first embodiment of the instant disclosure.
Figure 2:
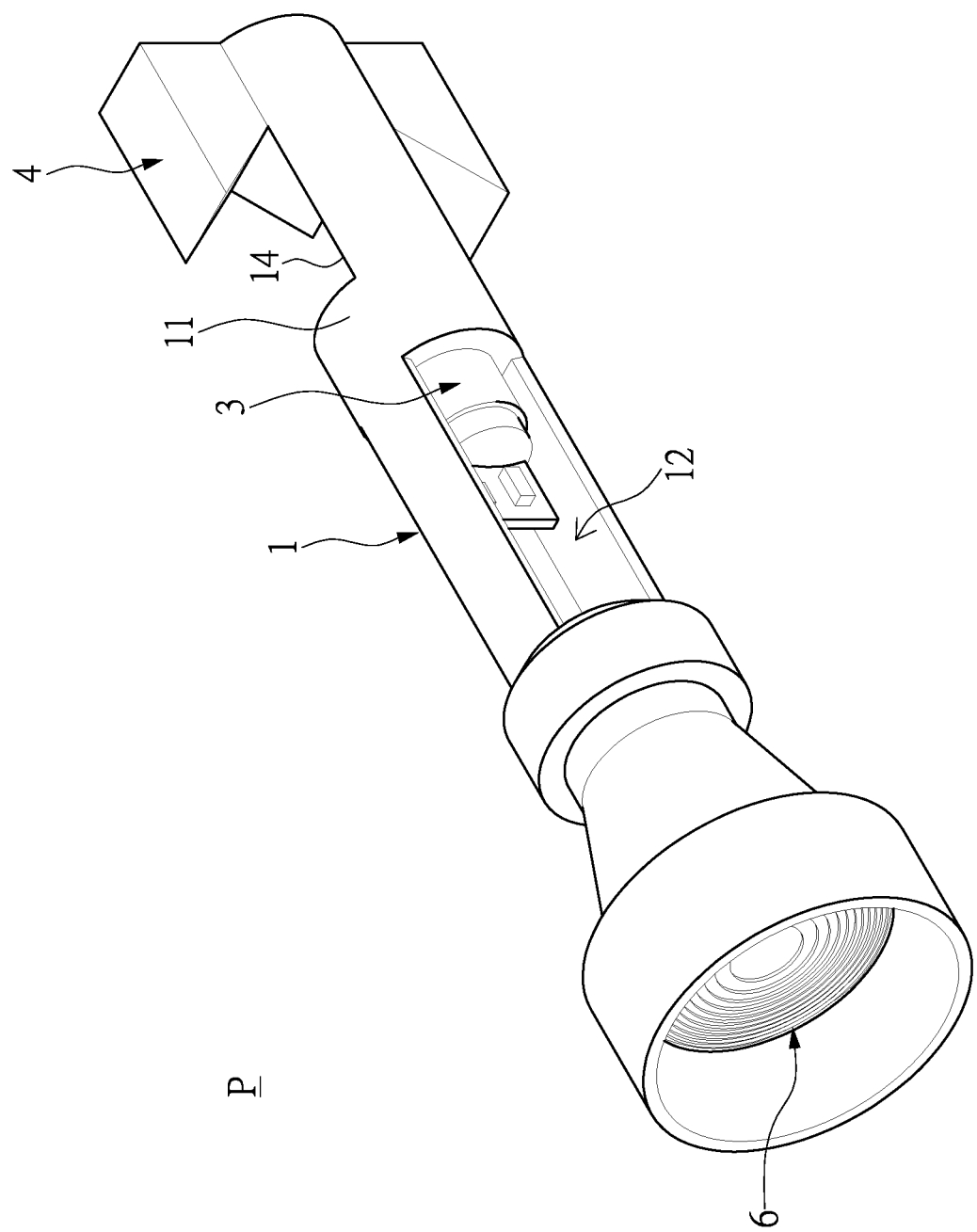
FIG. 2 is another three-dimensional assembled schematic view of the non-contact temperature measuring device of the first embodiment of the instant disclosure.
Figure 3:
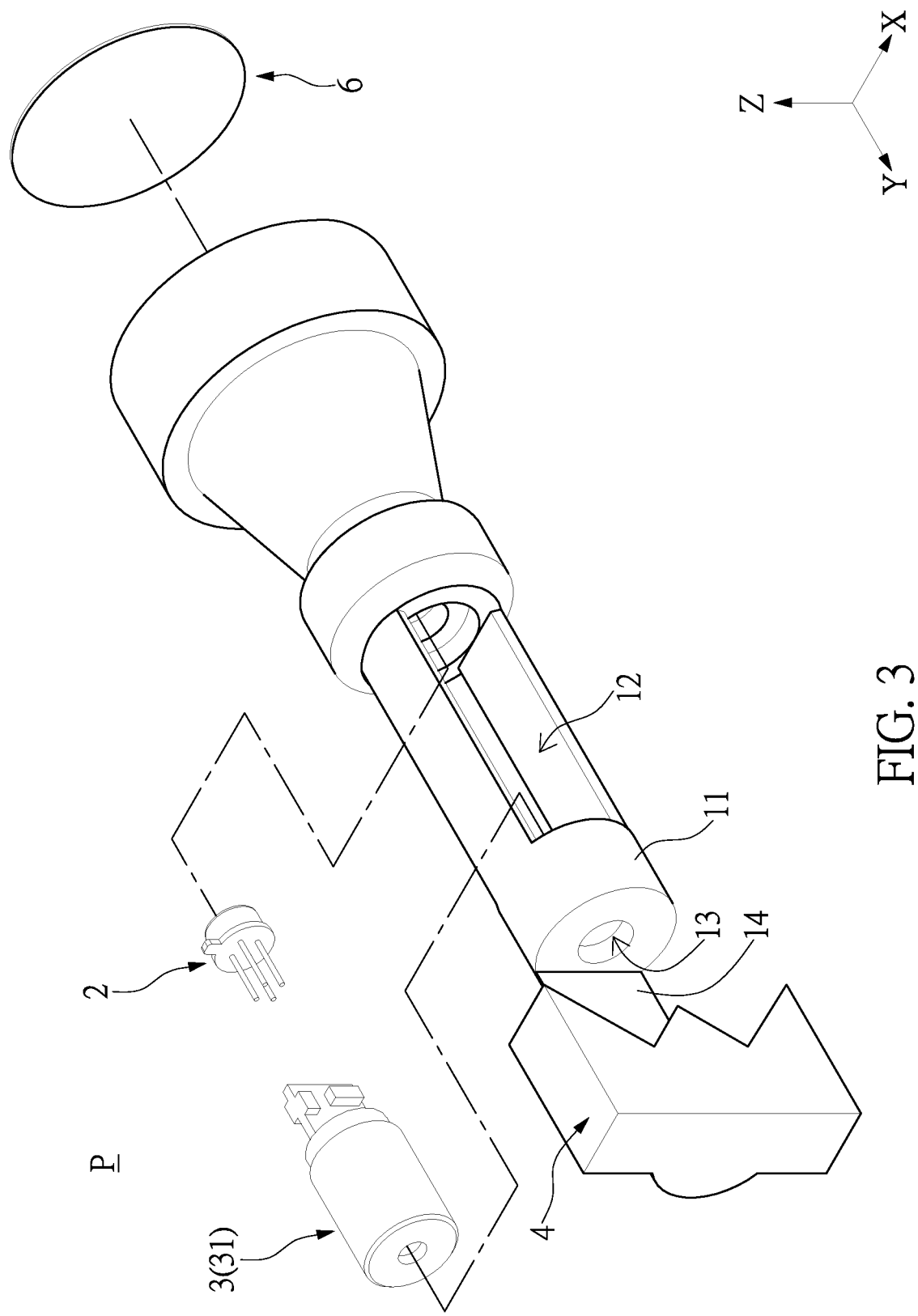
FIG. 3 is a three-dimensional exploded schematic view of the non-contact temperature measuring device of the first embodiment of the instant disclosure.
Figure 4:
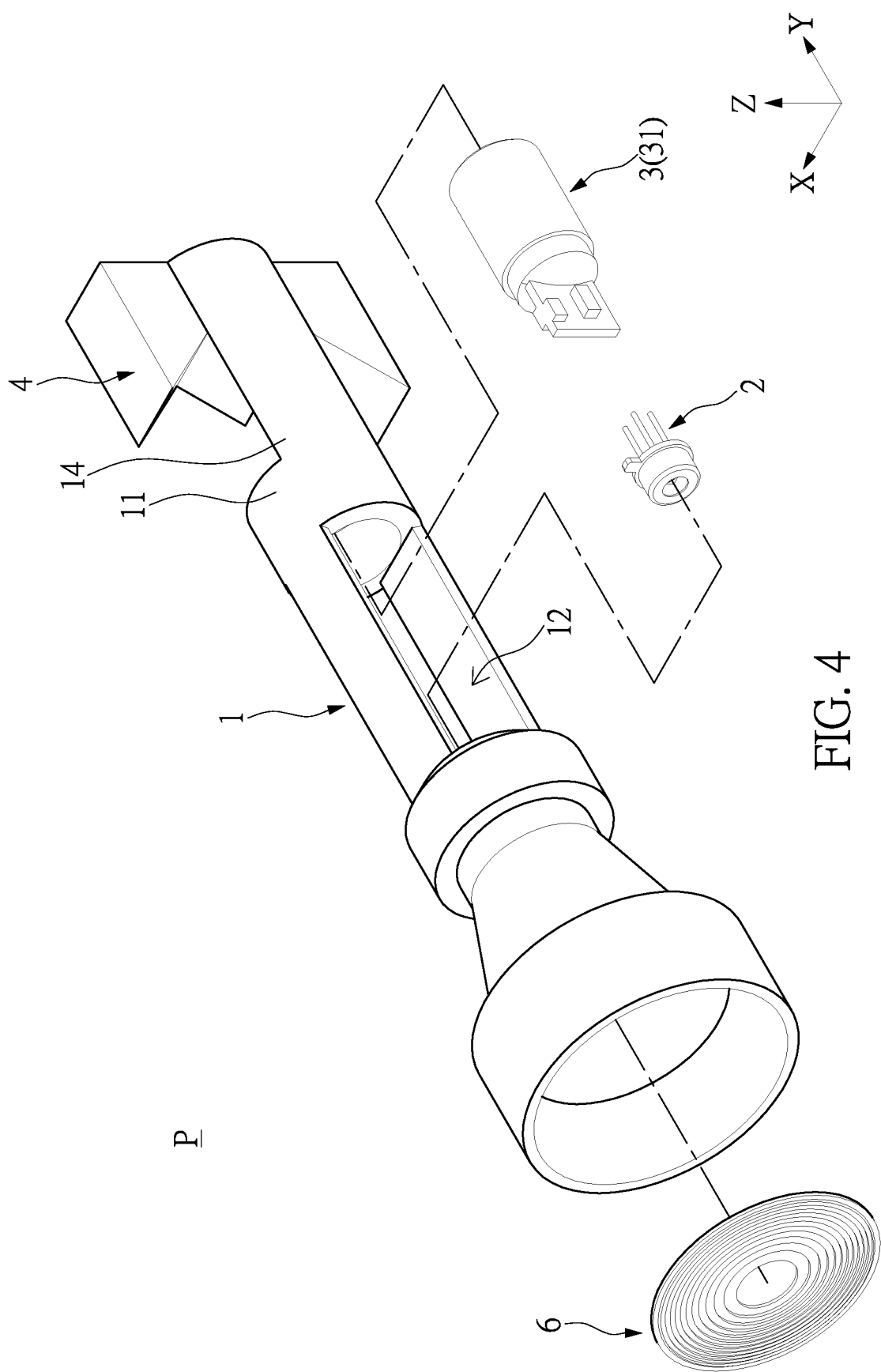
FIG. 4 is another three-dimensional exploded schematic view of the non-contact temperature measuring device of the first embodiment of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

It should be noted that the elements and signals are not limited by the terms "first", "second", "third" used therewith, and these terms are only used to distinguish different elements or signals. In addition, the term "or" used in the description can include a combination of one or more subjects listed in the related description in an actual implementation.

First Embodiment

Referring to FIG. 1 to FIG. 5, the instant disclosure provides a non-contact temperature measuring device P including a base 1, a temperature measuring module 2, a light module 3 and a reflecting module 4. The temperature measuring module 2, the light module 3 and the reflecting module 4 can be disposed on the base 1. In addition, in the embodiments of the instant disclosure, the reflecting module 4 and the base 1 can be integrally formed as a one-piece component. However, the instant disclosure is not limited thereto.

For example, the temperature measuring module 2 can be a radiation temperature measuring device such as a thermopile. The temperature measuring module 2 receives the infrared radiation energy generated by the heat of the object to be measured by an infrared sensor, and a received signal is calculated and processed for judging the temperature of the object. In addition, the light module 3 can be a laser module for generating a laser beam. However, the types of the temperature measuring module 2 and the light module 3 of the instant disclosure are not limited thereto.

Referring to FIGS. 1 to 6, the temperature measuring module 2 has a measuring area Z1. In other words, when the temperature measuring module 2 is an infrared thermometer, the measuring area Z1 is the measuring range thereof. Generally, the measuring area Z1 of the infrared thermometer has an initial value determined according to the predetermined FOV. Common D:S values of an infrared thermometer are 12:1 or 9:1, etc. An infrared thermometer having a D:S value of 12:1 can have a FOV of 4.8 degrees, and an infrared thermometer having a D:S value of 9:1 can have a FOV of 3 degrees. However, the instant disclosure is not limited thereto. The above description is related to the definitions of FOV and D:S value in the existing art.

Referring to FIGS. 1 to 5, exemplarily, the non-contact temperature measuring device P further includes a lens unit 6. The lens unit 6 can be disposed on the base 1 for performing focusing on the temperature measuring module 2. For example, the lens unit 6 can be a Fresnel lens. However, the instant disclosure is not limited thereto. In addition, the selection of the lens unit 6 can affect the FOV and the angle of view mentioned above. Exemplarily, the non-contact temperature measuring device P further includes a casing (not shown) covering the base 1, the temperature measuring module 2, the light module 3 and the reflecting module 4. Therefore, the casing can protect the elements disposed inside and acts as a housing of the non-contact temperature measuring device P.

Figure 5:
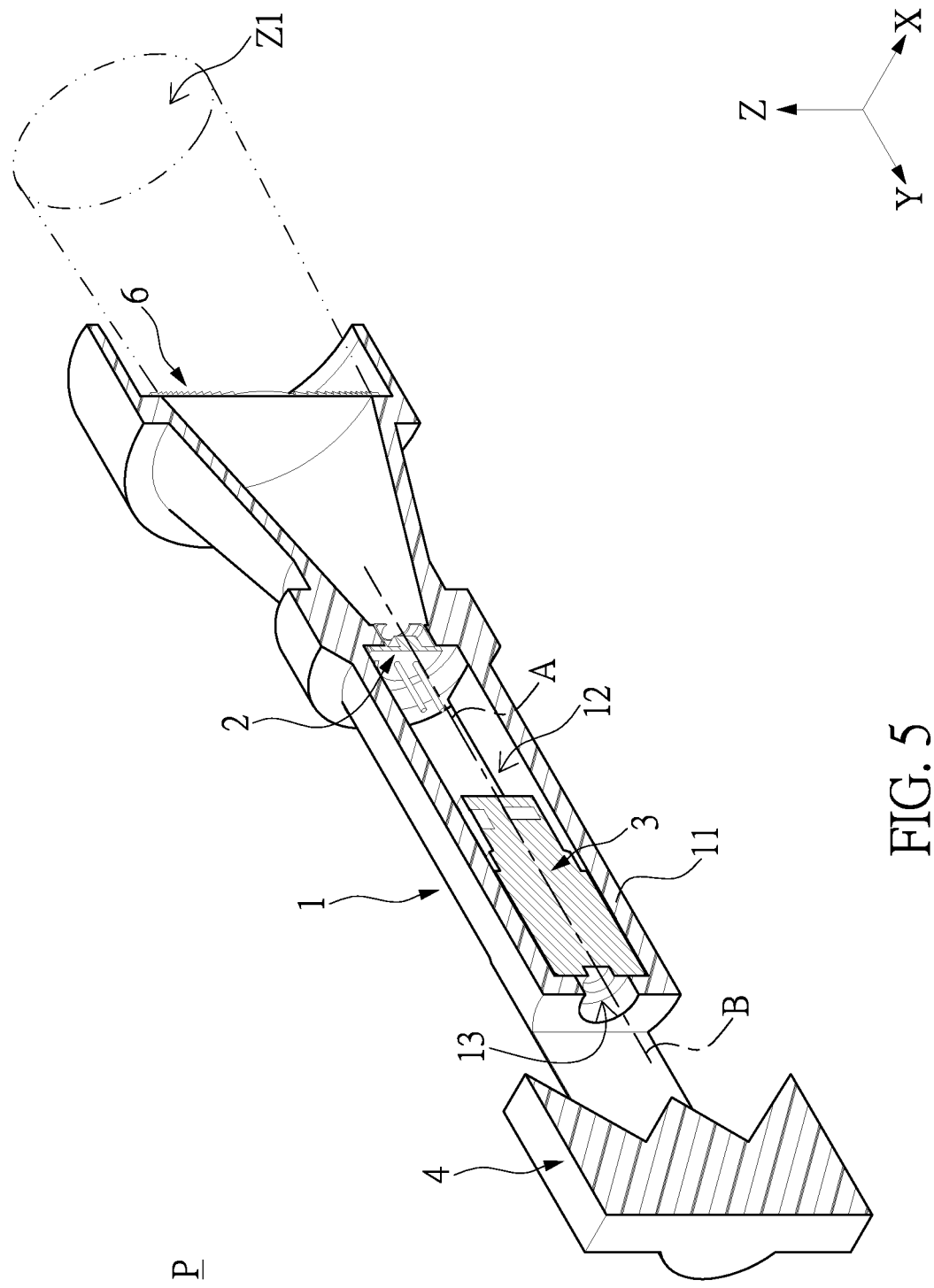
FIG. 5 is a three-dimensional sectional schematic view taken along line VI-VI in FIG. 1.
Figure 6:
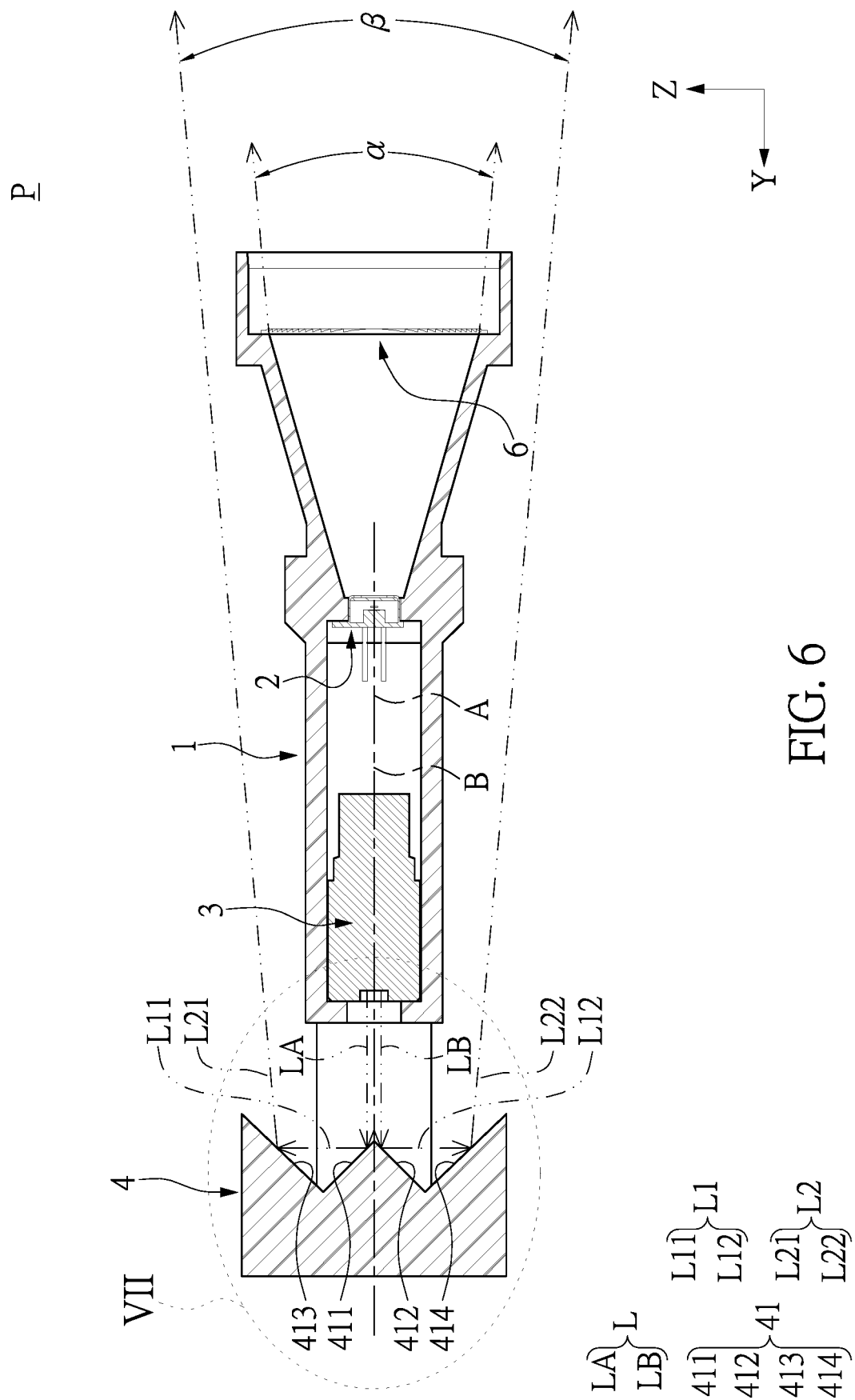
FIG. 6 is a side sectional schematic view taken along line VI-VI in FIG. 1.
Figure 7:
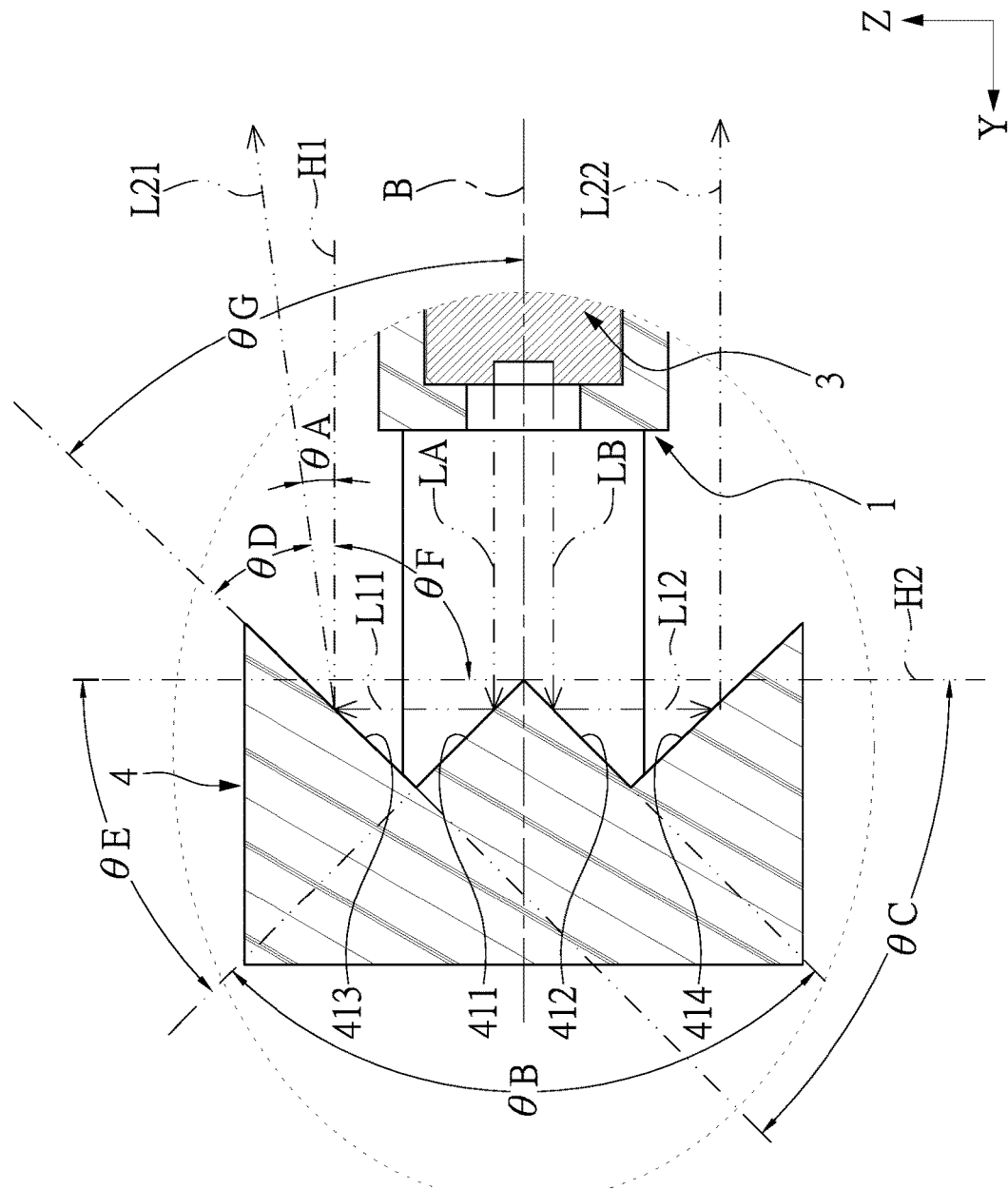
FIG. 7 is a fragmentary enlarged view of part VII in FIG. 6.
Figure 8:
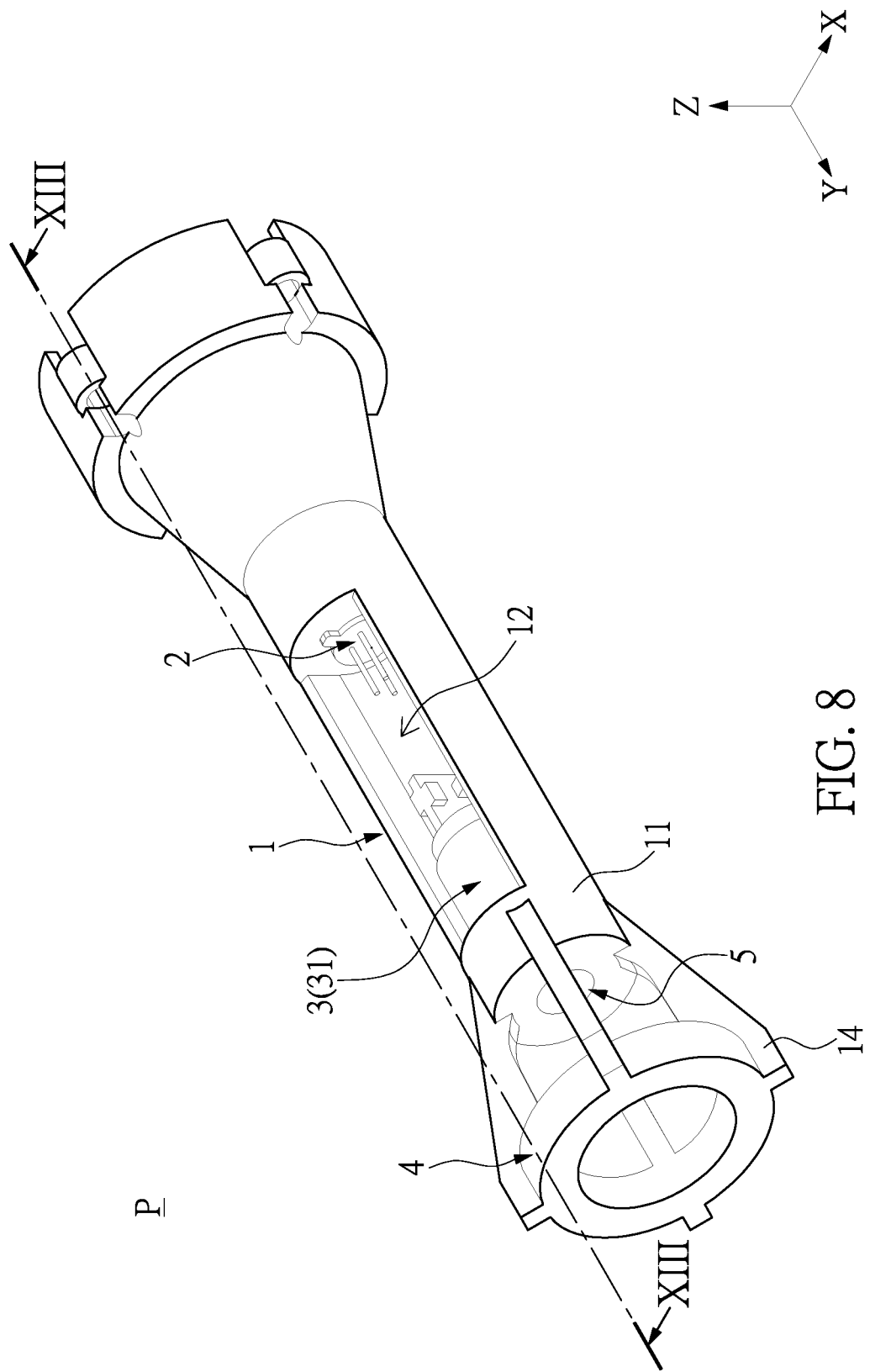
FIG. 8 is a three-dimensional assembled schematic view of the non-contact temperature measuring device of a second embodiment of the instant disclosure.
Figure 9:
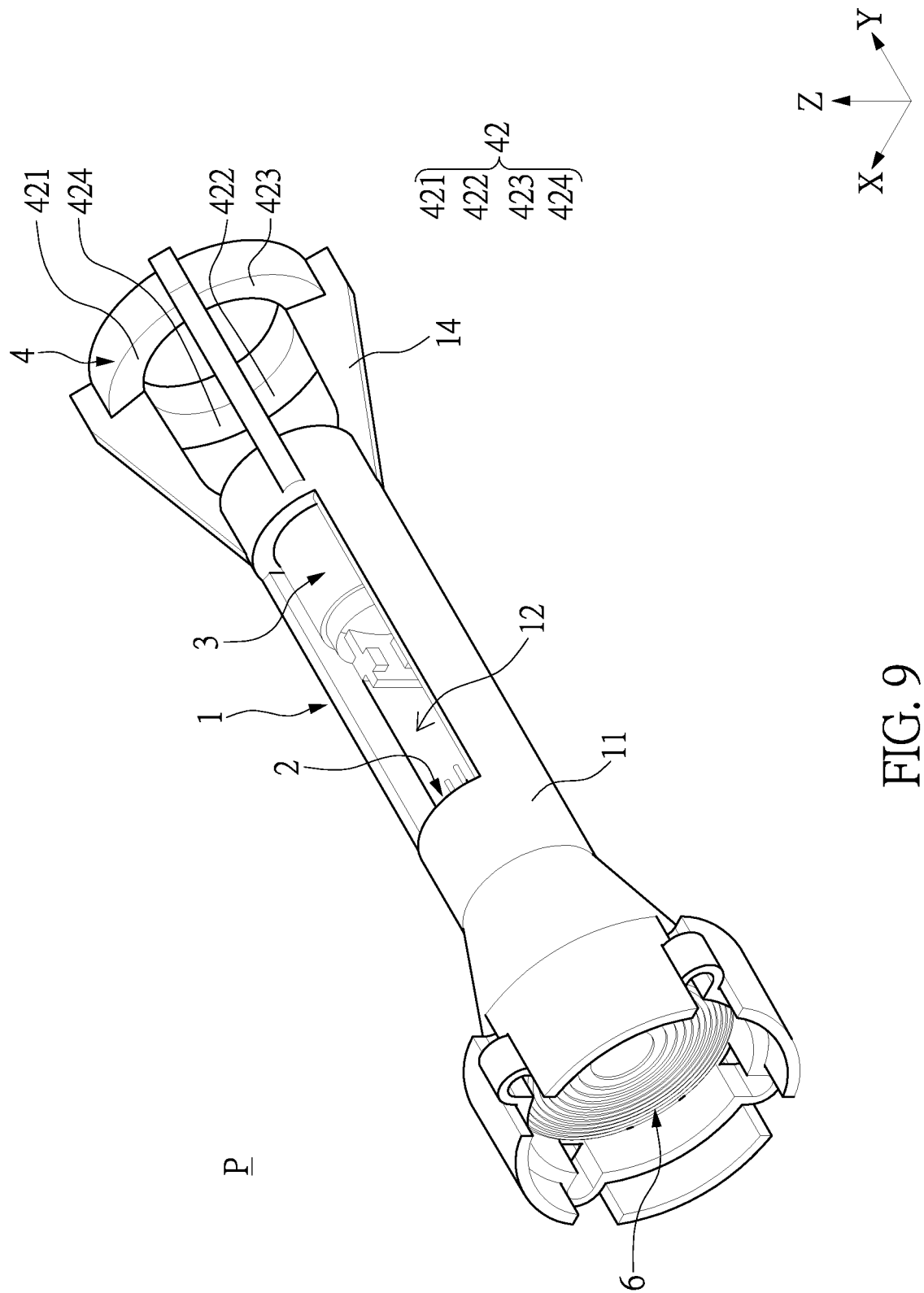
FIG. 9 is another three-dimensional assembled schematic view of the non-contact temperature measuring device of the second embodiment of the instant disclosure.
Figure 10:
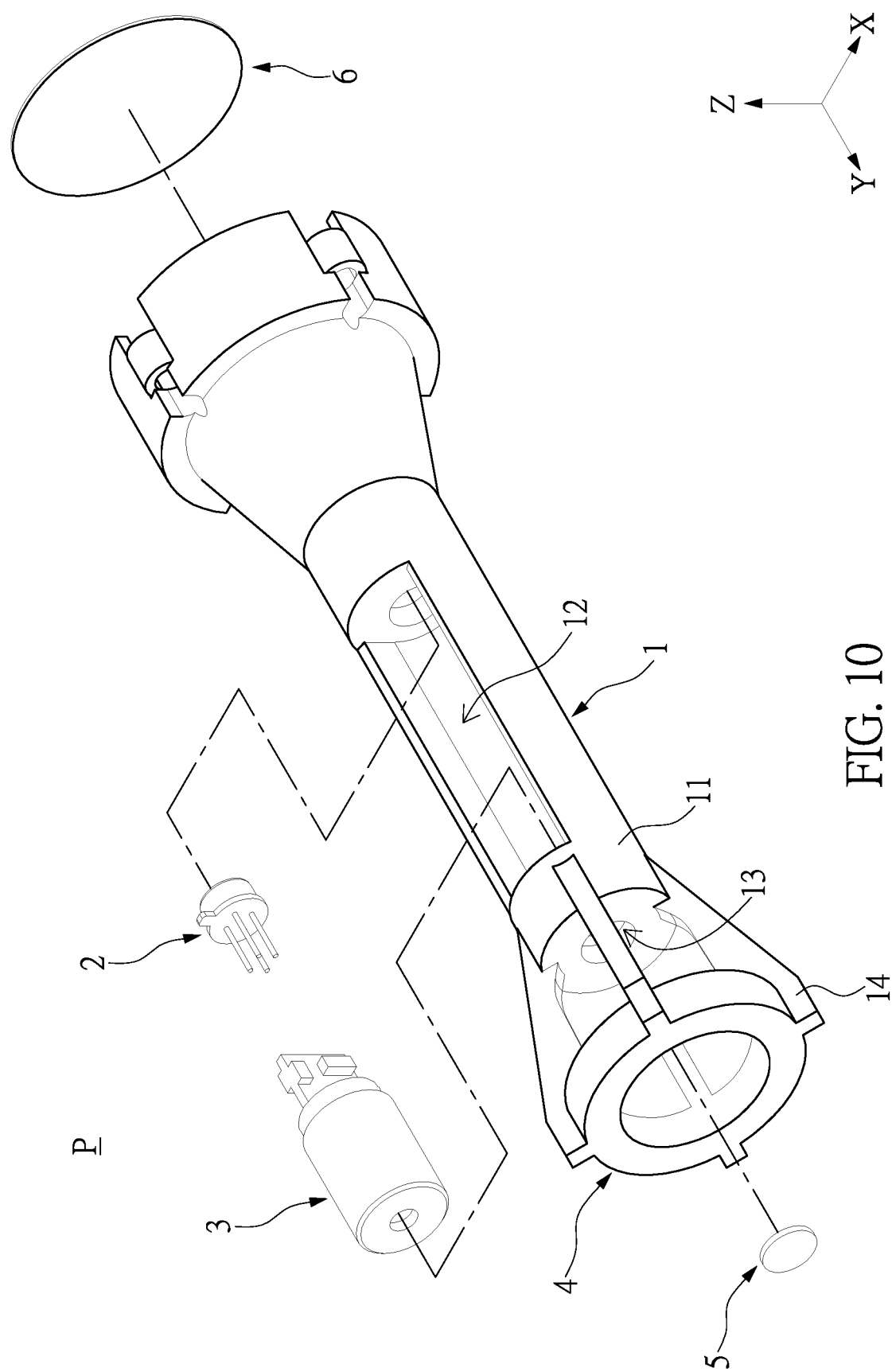
FIG. 10 is a three-dimensional exploded schematic view of the non-contact temperature measuring device of the second embodiment of the instant disclosure.
Figure 11:
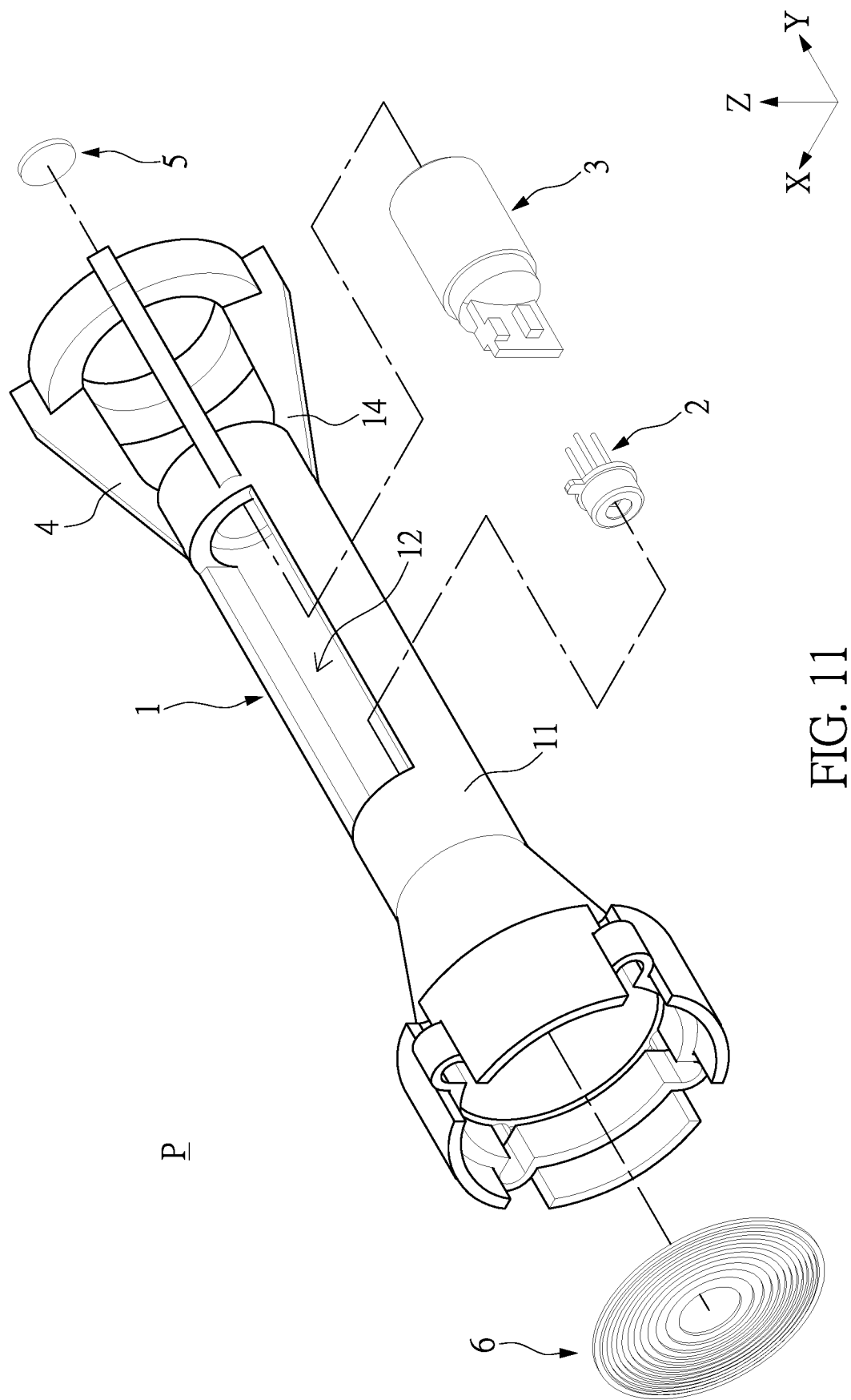
FIG. 11 is another three-dimensional exploded schematic view of the non-contact temperature measuring device of the second embodiment of the instant disclosure.

Reference is now made to FIGS. 5 to 7. The base 1 can include a body 11, a receiving slot 12 disposed on the body 11, an opening 13 disposed on the body 11 and a connecting portion 14 connected between the body 11 of the base 1 and the reflecting module 4. The temperature measuring module 2 and the light module 3 can be disposed in the receiving slot 12 of the base 1. In addition, the light module 3 has an optical central axis B defined therein, and the temperature measuring module 2 can have a measuring center axis A defined therein. For example, the light source center axis B and the measuring center axis A can be parallel to each other and co-axial with each other. However, the instant disclosure is not limited thereto. The temperature measuring module 2 can have a predetermined angle of view α of between 0.6 to 8 degrees. The predetermined angle of view α is the measuring angle, and hence, the value of the predetermined angle of view α of the temperature measuring module 2 can be selected according to different environments. It should be noted that the range of the FOV and the value of the angle of view are changed according to the selection of the lens unit 6. In other words, the range of the FOV and the value of the angle of view are determined by the parameters of the lens unit 6.

Figure 14:
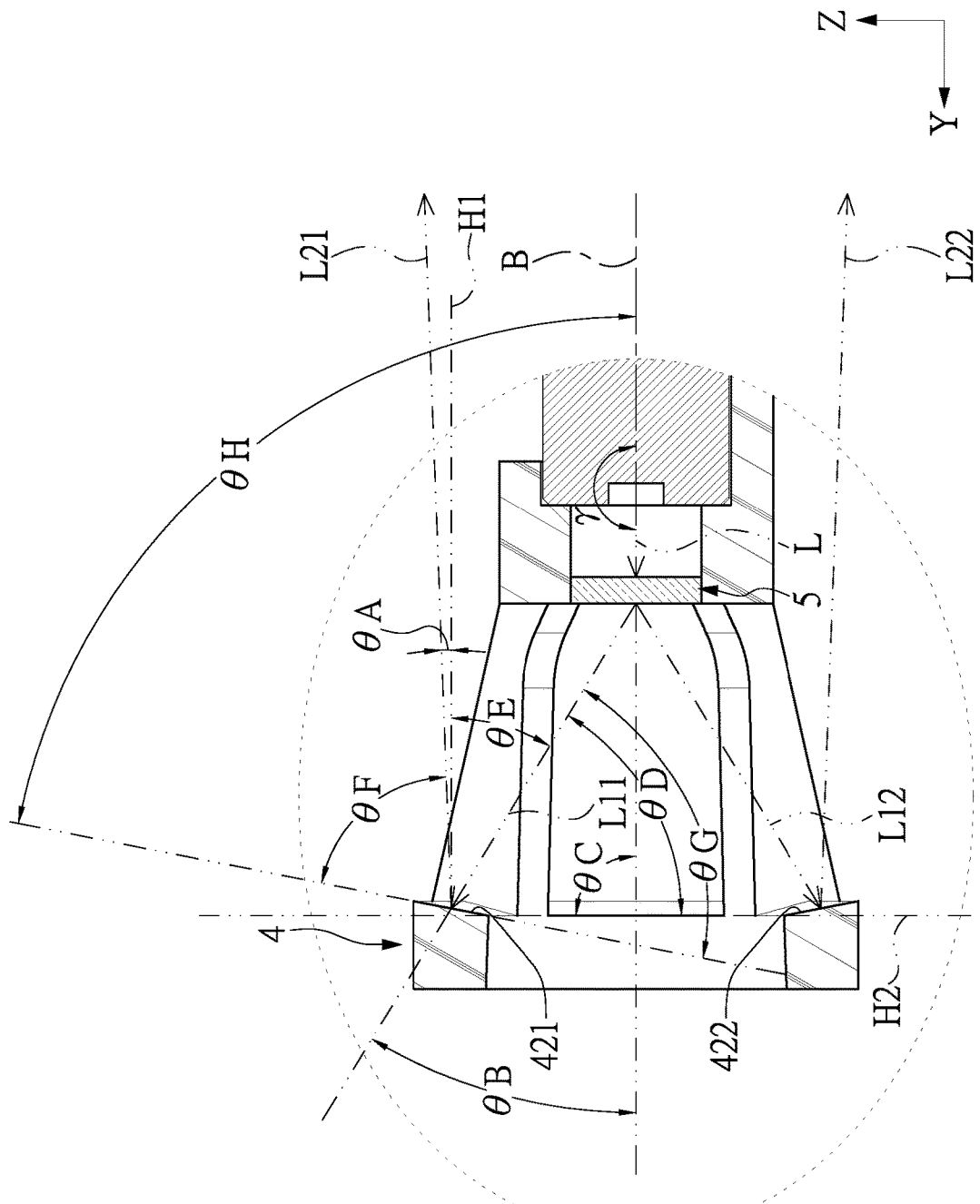
FIG. 14 is a fragmentary enlarged view of part XIV in FIG. 13.

As shown in FIGS. 5 to 7, the temperature measuring module 2 faces toward a measuring direction (negative Y direction) for projecting the measuring area Z1 along the measuring direction. In addition, the projecting light L generated by the light module 3 can be projected toward the reflecting surface 41 along a projecting direction (positive Y direction). In the embodiments of the instant disclosure, a predetermined inclined angle γ of from 120 to 180 degrees is presented between the measuring direction (negative Y direction) and the projecting direction (positive Y direction). For the purpose of clarity, the predetermined inclined angle γ is not illustrated in FIGS. 6 and 7, and is illustrated in FIG. 14 instead. Based on the design of the predetermined inclined angle γ of from 120 to 180 degrees, the light source center axis B and the measuring center axis A are co-axial with each other. Since the light module 3 provided by the first embodiment has one light generating unit 31, the projecting light L generated by the light generating unit 31 is emitted along the light source center axis B and the projecting direction (positive Y direction) is same as the extension direction of the light source center axis B. In addition, the measuring direction (negative direction Y) and the projecting direction (positive Y direction) are opposite to each other. In other words, the predetermined inclined angle γ between the measuring direction (negative direction Y) and the projecting direction (positive Y direction) is 180 degrees. It should be noted that in other embodiments (such as the embodiment shown in FIG. 15), the light module 3 can have at least two light generating units 31, and the predetermined inclined angle γ between the measuring direction (negative direction Y) and the projecting direction (positive Y direction) is not limited to 180 degrees. In the embodiments illustrated in FIG. 15, one of the two light generating units 31 generates a part of the projecting light L, and another one of the two light generating units 31 generates another part of the projecting light L.

It should be noted that the temperature measuring module 2 and the light module 3 can be electrically connected to a circuit substrate (not shown), and the temperature measuring module 2 and the light module 3 can be activated or deactivated by an activating module electrically connected to the circuit substrate (not shown, such as a button or a trigger switch). For example, the infrared radiation energy generated by the object to be measured can be calculated by the electronic devices on the circuit substrate while marking the measuring area Z1 projected onto the object by the light module 3. Next, the temperature value calculated by the circuit substrate is transmitted to a screen to inform the user. It should be noted that the controlling process of the temperature measuring module 2 and the light module 3 is well-known in the existing art and can be understood by those skilled in the art.

Reference is made to FIGS. 5 to 7. The light module 3 can generate a projecting light L projected on a reflecting surface 41 of the reflecting module 4, and the projecting light L can form at least two reflecting light beams L2 (such as the first reflecting light beam L21 and the second reflecting light beam L22) projected onto a location adjacent to the measuring area Z1 by being reflected by the reflecting surface 41. Specifically, taking the first embodiment as an example, the reflecting surface 41 can include a first reflecting surface 411, a second reflecting surface 412, a third reflecting surface 413 and a fourth reflecting surface 414. As shown in FIG. 6 and FIG. 7, the third reflecting surface 413, the first reflecting surface 411, the second reflecting surface 412 and the fourth reflecting surface 414 are connected sequentially for forming a W shape. However, the instant disclosure is not limited thereto. In other embodiments, the structure of the reflecting surfaces can be adjusted as long as the projecting light L can form at least two reflecting light beams L2 after being reflected by the reflecting surface 41. It should be noted that the reflecting surface 41 can has a coating layer disposed thereon for increasing the reflecting efficiency. However, the instant disclosure is not limited thereto.

Figure 16:
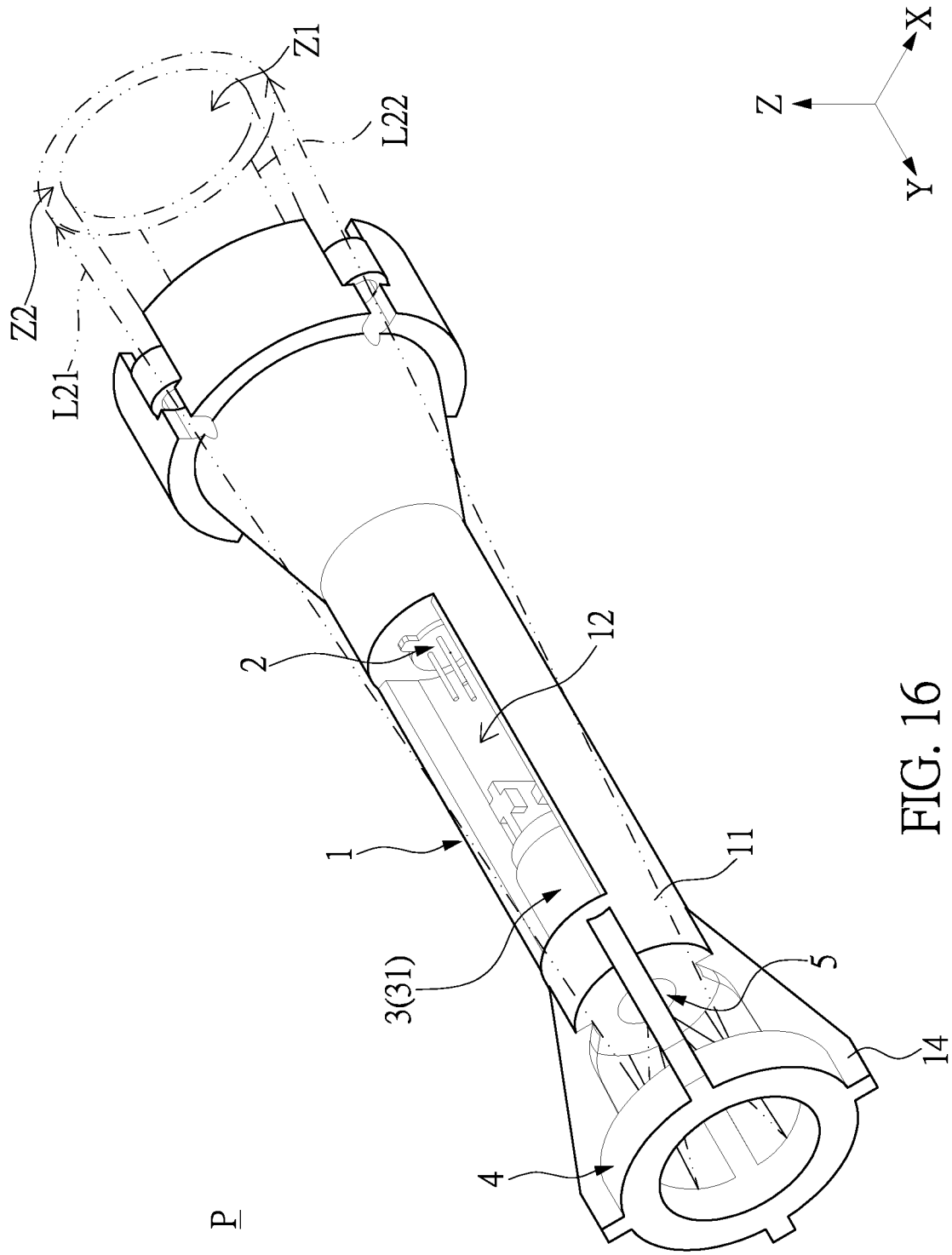
FIG. 16 is a marking area and a measuring area of the non-contact temperature measuring device of the second embodiment of the instant disclosure.

For example, in other embodiments, the reflecting module 4 can have a shape of a triangle cone or a pyramid, and the projecting light L can be projected onto the vertex of the triangle cone or the pyramid for being divided to form three or four parts of projecting light. Next, the reflecting lights are reflected by the reflecting surfaces and form two or more reflecting light beams L2 adjacent to the measuring area Z1. In other words, the two or more reflecting light beams L2 can form a marking area Z2 (as shown in FIG. 16) surrounded thereby, and the marking area Z2 and the measuring area Z1 overlap with each other. Exemplarily, the outmost location of the marking area Z2 (the location of the reflecting light beam L2 projected onto the object to be measured) is the same as the outmost location of the measuring area Z1, or the distance between the outmost location of the marking area Z2 and the outmost location of the measuring area Z1 is between 0 millimeters (mm) to 10 millimeters. Therefore, the marking area Z2 formed by the light module 3 is the same as the measuring area Z1. The user can identify the measuring range of the temperature measuring module 2 based on the marking area Z2. It should be noted that while the measuring area Z1 is illustrated to surround the marking area Z2, such an expression is only an example and the instant disclosure is not limited thereto.

Reference is now made to FIG. 6 and FIG. 7. The projecting light L passes through the opening 13 of the base 1 and is projected onto the reflecting surface 41. A part of the projecting light LA is projected onto the first reflecting surface 411 and is reflected by the first reflecting surface 411 for forming a first projecting light beam L11 projected onto the third reflecting surface 413. The first projecting light beam L11 is reflected onto the third reflecting surface 413 for forming one of the reflected light beams L2 (referred to as the first reflecting light beam L21). Next, the other part of the projecting light LB is projected onto the second reflecting surface 412 and is reflected by the second reflecting surface 412 for forming a second projecting light beam L12 projected onto the fourth reflecting surface 414. The second projecting light beam L12 is reflected by the fourth reflecting surface 414 and forms another reflecting light beam L2 of the at least two reflecting light beams L2 (referred to as the second reflecting light beam L22).

As shown in FIGS. 5 to 7, the projecting light L is reflected by the reflecting surface 41 and forms at least two reflecting light beams L2 that travel radially and apart from each other before projecting onto the measuring area. In other words, a projecting light L can be reflected by the reflecting module 4 and form at least two reflecting light beams L2. Therefore, the at least two reflecting light beams L2 (the first reflecting light beam L21 and the second reflecting light beam L22) surround a range forming the measuring area Z1 of the temperature measuring module 2. In other words, the range surrounded by the at least two reflecting light beams L2 is not only coaxial with the measuring area Z1 of the temperature measuring module 2 but also overlaps with the measuring area Z1 (as shown in FIG. 16).

As shown in FIG. 6 and FIG. 7, in order to render the range surrounded by the at least two reflecting light beams L2 to be overlapped with the measuring area Z1 of the temperature measuring module 2, the two reflecting light beams L2 can have a predetermined included angle β within a range of 0.6 to 8 degrees therebetween. In other words, the value of the predetermined included angle β can be changed according to the predetermined angle of view α. Exemplarily, the predetermined included angle β is substantially the same as the predetermined angle of view α. In addition, it should be noted that the predetermined included angle β can be adjusted by adjusting the angle of the reflecting surface, and the angle of the reflecting surface 41 can be adjusted in view of the FOV value of the temperature measuring module 2.

The details regarding the adjustment of the reflecting surface 41 is described herein. In this example, the temperature measuring module 2 and the lens unit 6 are selected in advance and the predetermined angle of view α is 4.8 degrees. The included angle between the first reflecting surface 411 and the second reflecting surface 412 is 90 degrees. In addition, in this example, a first predetermined axis H1 parallel to the projecting light L or the light source center axis B is used as a base line.

In order to render the predetermined included angle β between the first reflecting light beam L21 and the second reflecting light beam L22 to be equal to the predetermined angle of view α of the temperature measuring module 2, the first reflecting light beam L21 and the first predetermined axis H1 can have a first angle θA having a value half that of the predetermined angle of view α. Therefore, the first angle θA is 2.4 degrees, and the first reflecting surface 411 and the second reflecting surface 412 can have a second angle θB of 90 degrees (which is pre-set) therebetween. Therefore, a seventh angle θG (or the predetermined angle θG) between the third reflecting surface 413 and the light source center axis B or the measuring center axis A can be calculated based on the first angle θA and the second angle θB.

Reference is now made to FIG. 7. Since the second angle θB is 90 degrees, the projecting light LA and the first projecting light beam L11 are perpendicular to each other. For the sake of convenience, the second predetermined axis H2 parallel to the first projecting light beam L11 is taken as the baseline. Specifically, the third reflecting surface 413 and the second predetermined axis H2 can have a third angle θC therebetween, and the first reflecting light beam L21 and the third reflecting surface 413 can have a fourth angle θD therebetween. Furthermore, based on the reflection law, the third angle θC and the fourth angle θD are equal to each other. Meanwhile, based on the second angle θB (90 degrees), the fifth angle θE between the second predetermined axis H2 and the first reflecting surface 411 is 45 degrees and the sixth angle θF between the projecting light LA and the first projecting light beam L11 or the second predetermined axis H2 is 90 degrees. Therefore, the third angle θC and the fourth angle θD can be ((180−θA−θF)/2) degrees. The third angle θC and the fourth angle θD are both 43.8 degrees. The seventh angle θG can be 46.2 degrees. However, the instant disclosure is not limited thereto. In other words, the predetermined angle θG can be adjusted according to the predetermined angle α of view of the temperature measuring module 2. Exemplarily, in the first embodiment of the instant disclosure, the third reflecting surface 413 and the light source center axis B have a predetermined angle θG ranging between 45.2 and 47.2 degrees. It should be noted that when the predetermined angle α of view is from 0.6 to 8 degrees, the predetermined angle θG can be from 45.15 to 47 degrees.

Second Embodiment

Reference is made to FIGS. 8 to 12. Compared to FIG. 1, the second embodiment is different from the first embodiment in that the reflecting module 4 in the second embodiment is different. Specifically, the second embodiment provides a non-contact temperature measuring device P including a base 1, a temperature measuring module 2, a light module 3 and a reflecting module 4. The base 1, the temperature measuring module 2, the light module 3 are similar to the first embodiment and are not described again herein. In addition, the non-contact temperature measuring device P can include a lens unit 6 disposed on the base 1.

As shown in FIGS. 8 to 12 and 15, the light module 3 generates at least two projecting light beams L1 through the optical lens 5 disposed on an opening 13 of the base 1. For example, the optical lens 5 can be a grating, a prism or a hologram. However, the instant disclosure is not limited thereto. It should be noted that those skilled in the art can understand the actual structure of the optical lens 5 for dividing light, and hence, details of the optical lens 5 are not described herein. In addition, for example, the optical lens 5 and the base 1 can be integrally formed as a one-piece component, or can be formed separately; the instant disclosure is not limited thereto.

Figure 15:
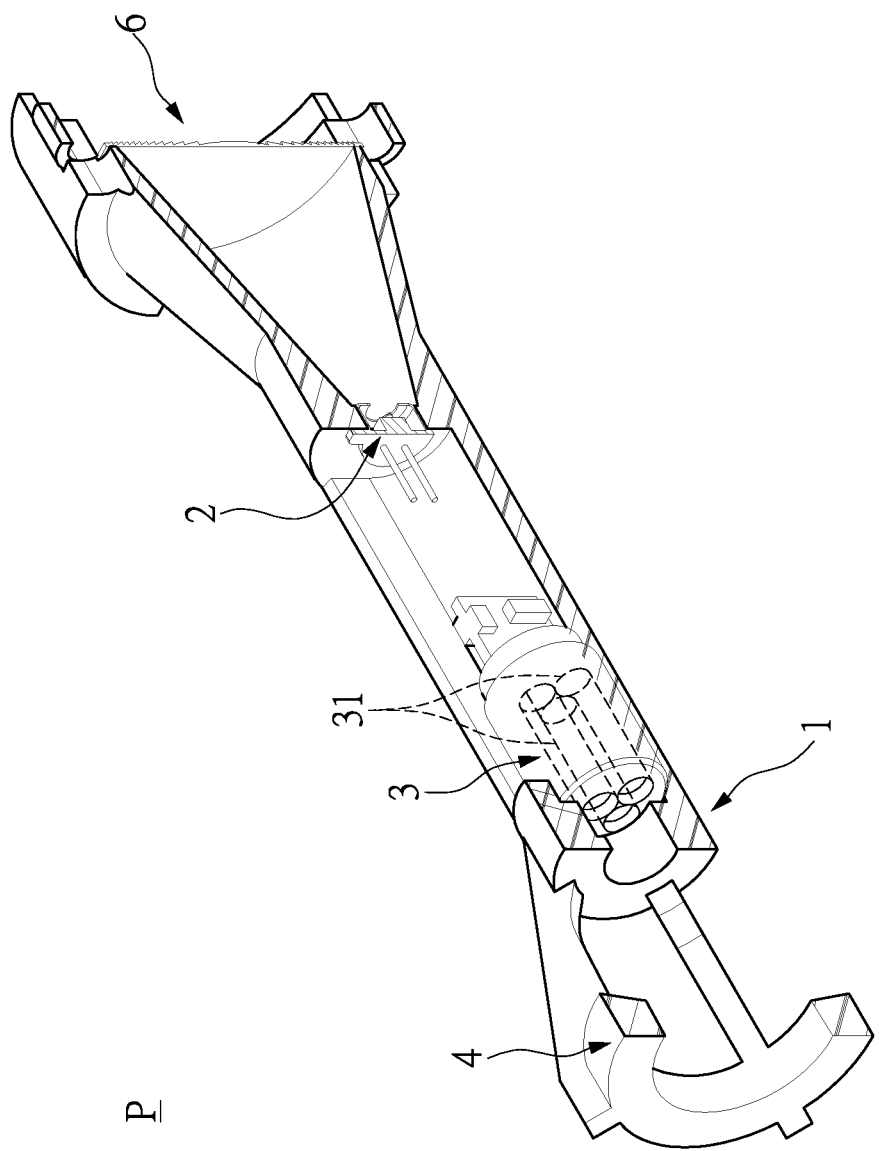
FIG. 15 is another three-dimensional schematic view of the non-contact temperature measuring device of the second embodiment of the instant disclosure.

In the embodiment shown in FIG. 15, the at least two projecting light beams L1 can be formed without the use of the optical lens 5. As shown in FIG. 15, the light module 3 can include at least two light generating units 31 for forming at least two projecting light beams L1. Specifically, one of the two light generating units 31 can generate one of the at least two projecting light beams L1, and the other one of the two light generating units 31 can generate the other one of the at least two projecting light beams L1.

Figure 12:
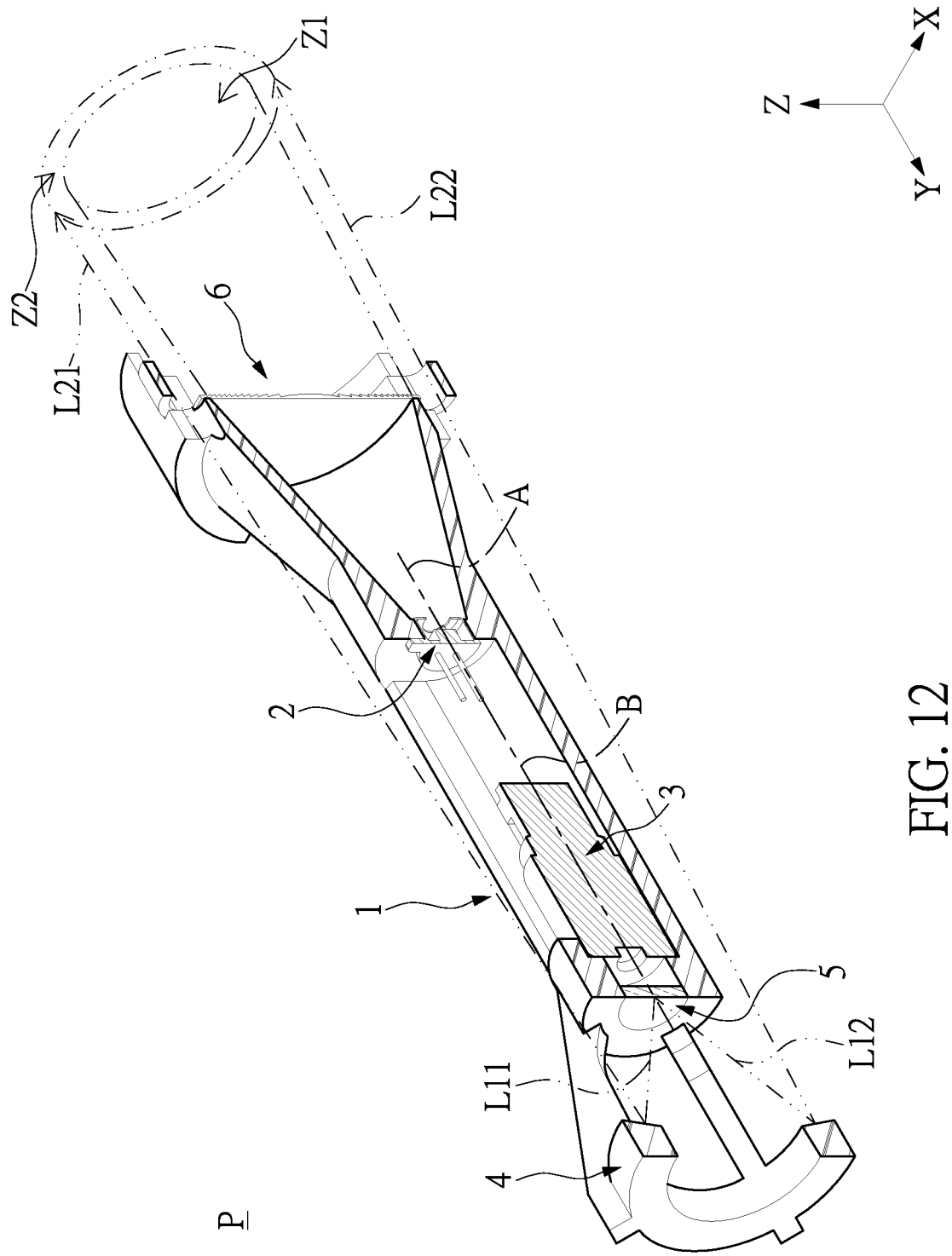
FIG. 12 is a three-dimensional sectional schematic view taken along line XIII-XIII in FIG. 8.
Figure 13:
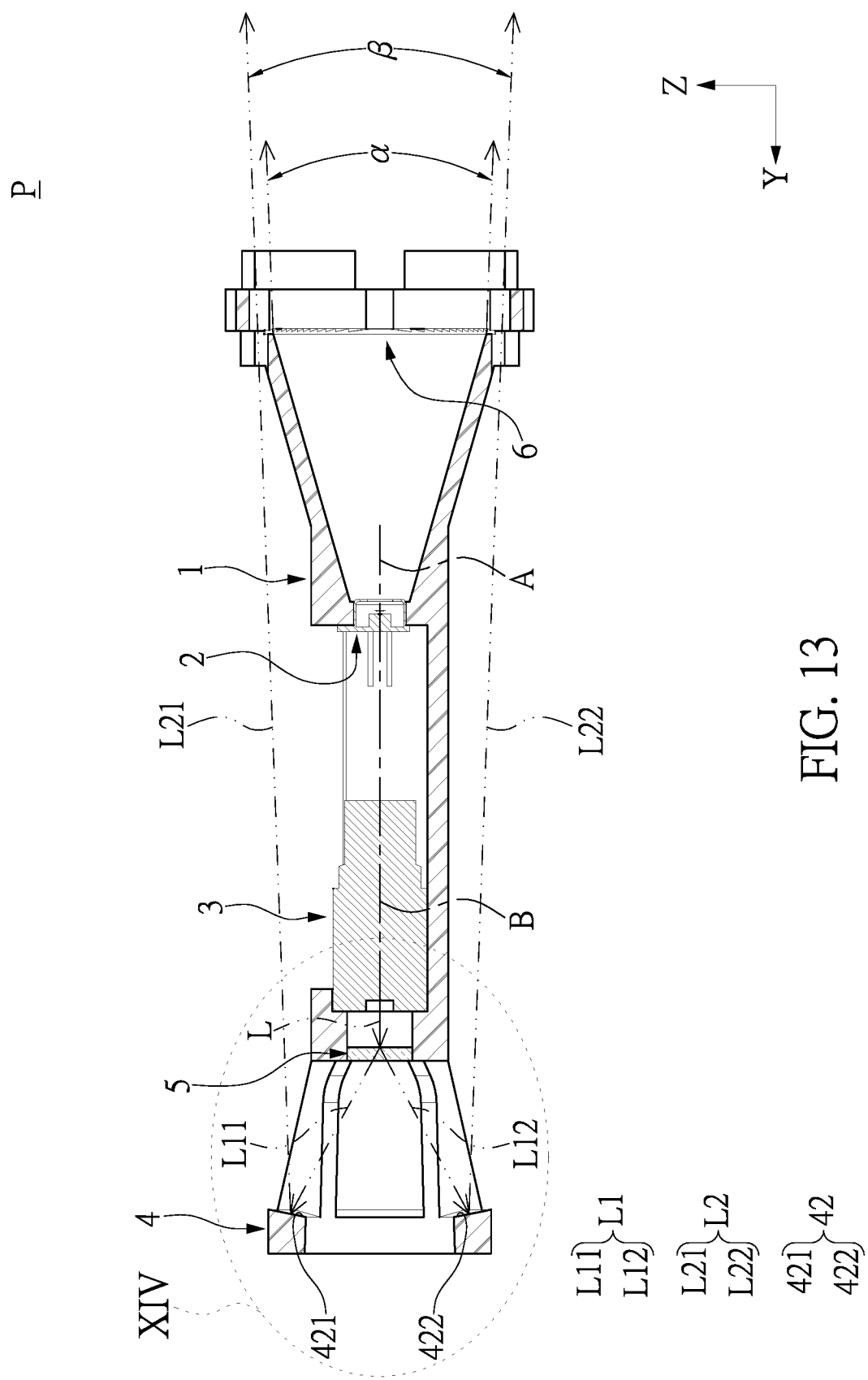
FIG. 13 is a side sectional schematic view taken along line XIII-XIII in FIG. 8.

Next, referring to FIG. 12 to FIG. 14, at least two projecting light beams L1 can be projected onto the reflecting inclined surface 42 of the reflecting module 4 and is reflected by the reflecting inclined surface 42 for forming at least two reflecting light beams L2 adjacent to the measuring area Z1. In addition, in the embodiments of the instant disclosure, the at least two reflecting light beams L travel radially and apart from each other before projecting onto the measuring area Z1.

Referring to FIG. 12 to FIG. 14, the light module 3 can have a light source center axis B and the temperature measuring module 2 can have a measuring center axis A. In the embodiments of the instant disclosure, the measuring center axis A and the light source center axis B are parallel to each other and are co-axial with each other. In addition, the temperature measuring module 2 is disposed in a direction facing a measurement direction (negative Y direction) for projecting the measuring area Z1 along a projecting direction (positive Y direction). In addition, at least two projecting light beams L1 are projected along a projecting direction (positive Y direction), and the measuring direction (negative Y direction) and the projecting direction (positive Y direction) have a predetermined inclined angle γ within a range of 120 to 180 degrees therebetween. In the embodiments of the instant disclosure, since the light source center axis B and the measuring center axis A are co-axial with each other and the light module 3 can have a light generating unit 31, the predetermined inclined angle γ can be about 180 degrees.

Referring to FIG. 13 and FIG. 14, the light path of the second embodiment is described herein. Specifically, the reflecting inclined surface 42 can include a first reflecting inclined surface 421, a second reflecting inclined surface 422, a third reflecting inclined surface 423 and a fourth reflecting inclined surface 424. However, the instant disclosure is not limited thereto. In other embodiments, as long as the reflecting inclined surface 42 has a first reflecting inclined surface 421 and a second reflecting inclined surface 422, the details of the reflecting inclined surface 42 can be adjusted. In the following description, the light path of the light projected onto the first reflecting inclined surface 421 and the second reflecting inclined surface 422 is described.

As shown in FIG. 13 and FIG. 14, the light module 3 can have a light generating unit 31, and the light generating unit 31 can generate a projecting light L projected onto the optical lens 5. The projecting light L is divided by the optical lens 5 and forms at least two projecting light beams L1 (the first projecting light beam L11 and the second projecting light beam L12). One of the at least two projecting light beams L1 (the first projecting light beam L11) can be projected onto the first reflecting inclined surface 421 and is reflected for forming one of the at least two reflecting light beams L2 (the first reflecting light beam L21). In addition, the other one of the two projecting light beams L1 (the second projecting light beam L12) can be projected onto the second reflecting inclined surface 422 and is reflected by the second reflecting inclined surface 422 for forming the other one of the two reflecting light beams L2 (the second reflecting light beam L22).

Referring to FIG. 16, after being reflected by the first reflecting inclined surface 421 and the second reflecting inclined surface 422, the at least two reflecting light beams L2 (the first reflecting light beam L21 and the second reflecting light beam L22) surround a range which is the measuring area Z1 of the temperature measuring module 2. In other words, the range surrounded by the at least two reflecting light beams L2 is not only co-axial with the measuring area Z1 of the temperature measuring module 2 but also overlaps with the temperature measuring module 2. In addition, in order to achieve the state that the range surrounded by the at least two reflecting light beams L2 is not only coaxial with the measuring area Z1 of the temperature measuring module 2 but also overlaps with the temperature measuring module 2, the at least two reflecting light beams L2 can have a predetermined angle β within the range of 0.6 to 8 degrees therebetween. It should be noted that as described in the first embodiment, the value of the predetermined angle β is determined based on the predetermined view of angle α of the temperature measuring module 2. Exemplarily, the value of the predetermined angle β is substantially the same as that of the predetermined angle of view α. In addition, the value of the predetermined angle β can be changed by adjusting the inclined angle of the reflecting inclined surface 42.

Referring to FIG. 13 and FIG. 14, the angle related to the reflecting inclined surface 42 and the adjustment thereof are described in detail. In the following example, since the temperature measuring module 2 is preselected, the predetermined view of angle α will be 4.8 degrees. Meanwhile, the light-emitting angle after light being divided by the optical lens 5 is preselected. Therefore, the light-emitting angle is 38 degrees. In addition, it should be noted that a first predetermined axis H1 parallel to the projecting light L or the light source center axis B is taken as a baseline. In order to render the predetermined included angle β to be between the first reflecting light beam L21 and the second reflecting light beam L22 and to be the same as the predetermined angle of view α of the temperature measuring module 2, the first reflecting light beam L21 and the first predetermined axis H1 can have a first angle θA therebetween, and the first angle θA is half of the predetermined angle of view α. Therefore, the first angle θA can be set as 2.4 degrees based on the view of angle α. Since the light-divided angle is 38 degrees, a second angle θB between the first projecting light beam L11 and the light source center axis B is 38 degrees. Therefore, an eighth angle θH between the first reflecting inclined surface 421 and the light source center axis B or the measuring center axis A (which can also be referred to as the eighth angle θH) can be calculated by the first angle θA and the second angle θB.

Reference is made to FIG. 14. In the second embodiment, a second predetermined axis H2 parallel to the projecting light L is used as the baseline, and the second predetermined axis H2 can be perpendicular to the projecting light L or the light source center axis B. Therefore, the second predetermined axis H2 and the projecting light L or the light source center axis B can have a third angle θC of 90 degrees therebetween. The first projecting light beam L11 and the second predetermined axis H2 can have a fourth angle θD therebetween, and the fourth angle θD can be calculated by the second angle θB and the third angle θC. Therefore, the value of the fourth angle θD is (180−θB−θC), which is 52 degrees. The first predetermined axis H1 and the first projecting light beam L11 can have a fifth angle θE therebetween, and the fifth angle θE can be calculated by the fourth angle θD, i.e., (90−θD), which is 38 degrees. The first reflecting inclined surface 421 and the first reflecting light beam L21 can have a sixth angle θF therebetween, and the sixth angle θF can be calculated by the reflection law, i.e., the sixth angle θF is equal to a seventh angle between the first projecting light beam L11 and the second predetermined axis H2. Therefore, the sixth angle θF and the seventh angle θG are both ((180−θA−θE)/2), i.e., 69.8 degrees. An eighth angle θH (i.e., the predetermined inclined angle θH) between the first reflecting inclined surface 421 and the light source center axis B or the measuring center axis A is (180−θB−θG), i.e., 72.2 degrees. However, the instant disclosure is not limited thereto. In other words, the predetermined inclined angle θH can be adjusted based on the predetermined view of angle α of the temperature measuring module 2 and the selection of the optical lens 5. Exemplarily, in the second embodiment of the instant disclosure, the first reflecting inclined surface 421 and the light source center axis B have a predetermined inclined angle θH within the range of 71.2 to 73.2 degrees therebetween. It should be noted that when the predetermined view of angle is from 0.6 to 8 degrees, the predetermined inclined angle θH can be from 71.15 to 73 degrees.

Effectiveness of the Embodiments

The advantages of the instant disclosure resides in that by using the reflecting module 4 of the non-contact temperature measuring device 2, at least two reflecting light beams L2 can be formed at a location adjacent to the measuring area Z1. Therefore, a marking area Z2 surrounded by the two reflecting light beams L2 overlaps with the measuring area Z1, and the range thereof changes when the distance between the object to be measured and the non-contact temperature measuring device P changes. In other words, the outmost location of the marking area Z2 projected by the light module 3 is the same as the measuring area Z1 projected by the temperature measuring module 2, and hence, the user can easily understand the measuring range of the temperature measuring module 2 at the time of measurement.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:
1. A non-contact temperature measuring device comprising:
   a base;
   a temperature measuring module disposed on the base, wherein the temperature measuring module has a measuring area;
   a light module disposed on the base, wherein the light module is configured to generate a projecting light; and
   a reflecting module disposed on the base and having a reflecting surface;
   wherein the projecting light is projected onto the reflecting surface and is reflected by the reflecting surface for forming at least two reflecting light beams adjacent to the measuring area;
   wherein the temperature measuring module faces a measuring direction for projecting the measuring area along the measuring direction, the projecting light projecting toward the reflecting surface along a projecting direction, the measuring direction and the projecting direction are opposite to each other;
   wherein the light module has an optical central axis and the temperature measuring module has a measuring central axis, the temperature measuring module having a predetermined angle of view ranging between 0.6 and 8 degrees, the at least two reflecting light beams having a predetermined included angle within the range of 0.6 to 8 degrees therebetween;
   wherein the reflecting surface has a first reflecting surface, a second reflecting surface, a third reflecting surface and a fourth reflecting surface, wherein a part of the projecting light is projected onto the first reflecting surface and is reflected by the first reflecting surface for forming a first projecting light beam projected onto the third reflecting surface, the first projecting light beam being reflected by the third reflecting surface for forming one of the at least two reflecting light beams, wherein another part of the projecting light is projected onto the second reflecting surface and is reflected by the second reflecting surface for forming a second projecting light beam projected on to the fourth reflecting surface, the second projecting light beam being reflected by the fourth reflecting surface for forming another one of the at least two reflecting light beams;
   wherein the third reflecting surface, the first reflecting surface, the second reflecting surface and the fourth reflecting surface are connected in sequence for forming a structure in W-shape;

wherein the third reflecting surface and the light source central axis having a predetermined angle from 45.15 to 47 degrees therebetween;

wherein the optical central axis and the measuring central axis are parallel to each other and co-axial with each other.

2. The non-contact temperature measuring device according to claim 1, wherein the light module includes at least two light-generating units, one of the two light-generating units is configured to generate a part of the projecting light, and another one of the two light-generating units is configured to generate another part of the projecting light.

3. The non-contact temperature measuring device according to claim 1, wherein the light module is a laser module and includes at least one light generating unit.

4. The non-contact temperature measuring device according to claim 1, wherein the at least two reflecting light beams are projected onto the measuring area to travel radially and apart from each other before projecting onto the measuring area.

5. The non-contact temperature measuring device according to claim 1, wherein the temperature measuring module includes a lens unit disposed on the base.

* * * * *